(12) United States Patent
Danielli

(10) Patent No.: US 6,952,884 B2
(45) Date of Patent: Oct. 11, 2005

(54) APPARATUS FOR CHECKING DIMENSIONAL AND GEOMETRICAL FEATURES OF PINS

(75) Inventor: Franco Danielli, Zola Predosa (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 10/466,609

(22) PCT Filed: Feb. 26, 2002

(86) PCT No.: PCT/EP02/02022

§ 371 (c)(1),
(2), (4) Date: Jul. 18, 2003

(87) PCT Pub. No.: WO02/070195

PCT Pub. Date: Sep. 12, 2002

(65) Prior Publication Data

US 2004/0055172 A1 Mar. 25, 2004

(30) Foreign Application Priority Data

Mar. 2, 2001 (IT) .................................... BO2001A0113

(51) Int. Cl.[7] ................................................ G01B 3/00
(52) U.S. Cl. ........................ 33/555.1; 33/553; 33/551; 33/501.02
(58) Field of Search ........................ 33/501.02, 501.03, 33/501.04, 555.1, 555, 553, 551, 549, 550

(56) References Cited

U.S. PATENT DOCUMENTS

| | | | | |
|---|---|---|---|---|
| 1,557,903 A | * | 10/1925 | Tornberg | ..................... 33/549 |
| 1,892,005 A | * | 12/1932 | Richmond | ............... 33/501.02 |
| 2,789,354 A | * | 4/1957 | Polidor et al. | ................ 33/551 |
| 3,802,087 A | * | 4/1974 | Raiteri | ...................... 33/555.1 |
| 3,863,352 A | * | 2/1975 | Peonski | ....................... 33/549 |
| 4,106,241 A | * | 8/1978 | Fisk | ........................ 33/501.02 |
| 4,175,462 A | * | 11/1979 | Simon | .......................... 84/728 |
| 4,480,412 A | * | 11/1984 | Shank et al. | ............. 33/501.04 |
| 4,679,331 A | * | 7/1987 | Koontz | ........................ 33/551 |
| 6,088,924 A | | 7/2000 | Esteve | |
| 6,430,832 B1 | * | 8/2002 | Dall'Aglio et al. | ......... 33/555.1 |
| 6,560,890 B1 | * | 5/2003 | Madge et al. | ................. 33/549 |
| 6,568,096 B1 | * | 5/2003 | Svitkin et al. | ................ 33/550 |
| 2002/0020075 A1 | * | 2/2002 | Dall'Aglio et al. | ......... 33/555.1 |

FOREIGN PATENT DOCUMENTS

| | | | | |
|---|---|---|---|---|
| EP | 0 903 199 | | 3/1999 | |
| GB | 2197477 A | * | 5/1988 | ............ G01B/7/00 |
| WO | WO 92/14120 | * | 8/1992 | ................ 33/555.1 |
| WO | WO 97/12724 | | 4/1997 | |

* cited by examiner

Primary Examiner—G. Bradley Bennett
Assistant Examiner—Travis Reis
(74) Attorney, Agent, or Firm—Dickstein Shapiro Morin & Oshinsky LLP

(57) ABSTRACT

An apparatus for checking the diameter and the roundness of pins, for example crankpins and main journals of a crankshaft rotating about its main axis of rotation (8), includes a measuring device, coupled to a Vee-shaped reference device (20) and including a feeler (17) axially movable along the bisecting line of the Vee, or a direction slightly sloping with respect to it, and a movable support device for the reference Vee. The support device includes a support element (5) and a coupling mechanism that carries the reference Vee (20). The coupling mechanism includes, for example, two support sections (e.g. parallelogram structures) in series and enables plain translation displacements of the reference Vee. While checking an orbitally rotating crankpin, the Vee-shaped device maintains proper contact with the surface of the pin by virtue of the force of gravity, and the angular arrangement of the direction along which the feeler (17) moves remains substantially unchanged.

20 Claims, 6 Drawing Sheets

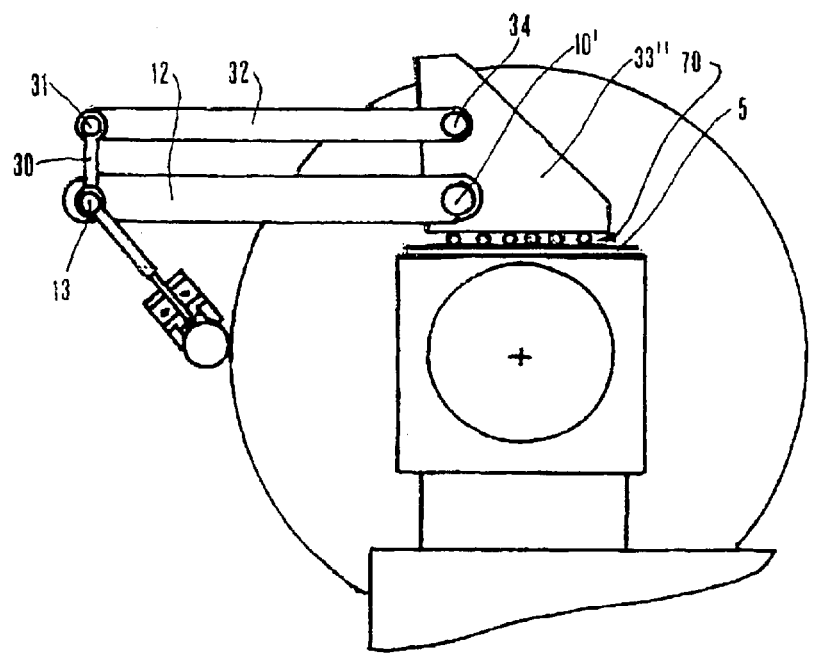
FIG. 8
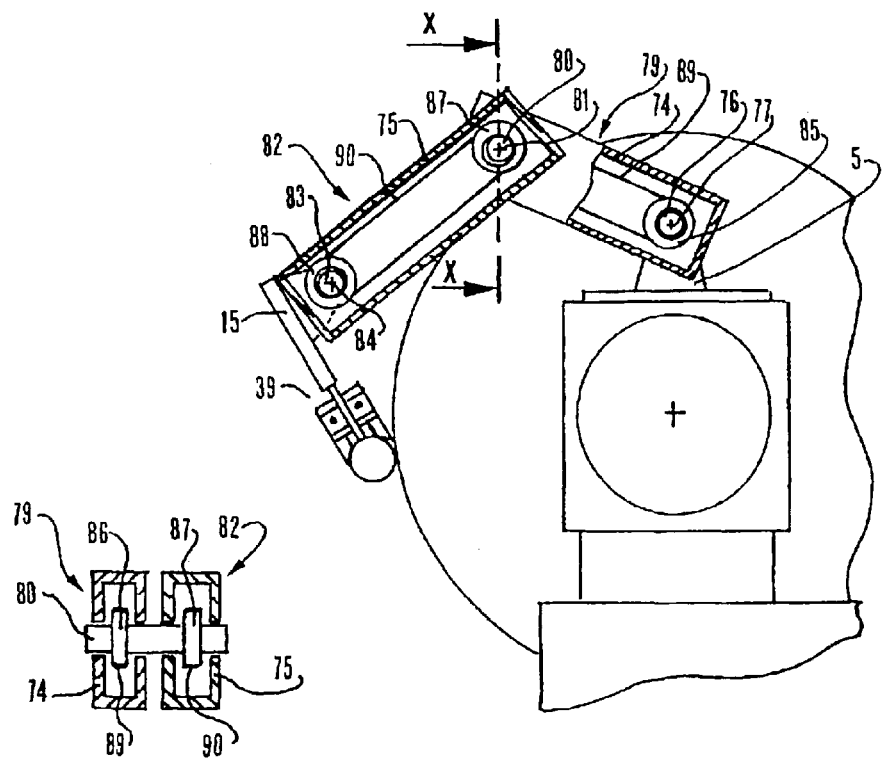
FIG. 10
FIG. 9

APPARATUS FOR CHECKING DIMENSIONAL AND GEOMETRICAL FEATURES OF PINS

TECHNICAL FIELD

The present invention relates to an apparatus for checking dimensional and geometrical features of a pin, rotating about a geometrical axis of rotation, with a Vee-shaped device that defines rest and reference surfaces adapted for cooperating with the pin to be checked, a measuring device, coupled to the Vee-shaped device and including a feeler for contacting the surface of the pin to be checked and performing linear displacements along a measurement direction laying between the rest and reference surfaces of the Vee-shaped reference device, and a support device for supporting the Vee-shaped device and the measuring device, the support device including a stationary support element, and a coupling mechanism with coupling elements coupled in a movable way to the stationary support element and carrying the Vee-shaped device.

BACKGROUND ART

Apparatuses with these characteristics, for example for the checking of a crankpin diameter of a crankshaft rotating with orbital motion about a geometrical axis in the course of the machining in a grinding machine, are disclosed in international patent application published with No. WO-A-9712724, filed by the same applicant of the present application.

In particular, according to the embodiments shown and described in the above mentioned international patent application, the apparatuses have Vee-shaped reference devices that rest on the crankpin to be checked, and maintain correct cooperation with the surface of the crankpin substantially owing to the force of gravity. The embodiments disclosed in the above-mentioned patent application guarantee excellent metrological results and small forces of inertia, and the standards of performance of the apparatuses with these characteristics, manufactured by the applicant of the present patent application, confirm the remarkable quality and reliability of the applications. Furthermore, these known apparatuses can be utilized for carrying out roundness checkings of the cylindrical surfaces of the pins, while the crankshaft is assembled and rotates on the grinding machine.

International patent application published with No. WO-A-0166306, filed by the same applicant of the present patent application, relates to an apparatus and a method for checking the roundness of crankpins in orbital rotation on a grinding machine. This international patent application describes the detecting of diameter dimensions of the crankpin, at predetermined angular positions of the crankshaft rotation, by means of a gauging head including a feeler and Vee-shaped reference surfaces that rest on the piece and a transducer that detects displacements of the feeler along a direction of measurement coincident with the bisecting line of the Vee or slightly inclined with respect to it.

The detected dimensions are processed, for both compensating alterations due to the particular type of head used (modulation of the shape errors of the checked surface that is in contact with the reference Vee) and carrying out other compensations for keeping into account the position taken by the head on the surface of the crankpin, more specifically the angularly arranged position of the point of contact of the feeler with respect to a known reference position, that depends on the relative arrangement between the support element and the crankshaft and on the characteristics and consequent configurations taken by the support device carrying the head. FIGS. 1a and 1b show, in an extremely simplified form, some parts of a known apparatus, coupled to the grinding-wheel slide of a grinding machine, in the course of the checkings of a cylindrical crankpin. In order to emphasize how the angular arrangement of the measurement direction D defined by feeler T depends on the mutual position between piece to be checked and coupling area of the apparatus, FIGS. 1a and 1b show two different checking conditions. In the first condition (FIG. 1a) the apparatus checks the pin while the latter is in contact with the grinding wheel, in the second condition (FIG. 1b), the checking takes place while the grinding-wheel slide is retracted with respect to the piece. It is also necessary to realize that in the course of the checking of a pin in orbital motion (for example a crankpin), variations in the configuration of the support device cause consequent variations in the angular arrangement of the feeler.

The method according to international patent application WO-A-0166306 enables to achieve excellent results, notwithstanding the unavoidable approximations due to the various processings, that are based on the theoretic behavior of the involved mechanic parts.

DISCLOSURE OF INVENTION

Object of the present invention is to provide an apparatus for the dimensional and geometrical checking of pins rotating in the course of the machining in a machine tool, for example for the in-process checking, in a grinding machine, of crankpins rotating with an orbital motion, that guarantee the same standards of performance, in terms of accuracy and reliability, as those of the apparatuses according to the above-mentioned international patent applications and enables a simpler checking of the roundness characteristics of the pins.

This problem is solved by a checking apparatus of the hereinbefore mentioned type, wherein the coupling mechanism further includes constraining elements adapted for enabling substantially plain translation displacements of the Vee-shaped device with respect to the stationary support element.

The support element according to the invention enables the Vee-shaped reference device and the measuring device to accomplish substantially plain translation displacements in the plane perpendicular to the axis of rotation. In other words, as shown in simplified form in FIGS. 2a and 2b, the angular arrangement of the measurement direction D along which feeler T translates does not vary when the arrangement of the various parts forming the support device vary.

An advantage that the present invention provides is that of setting beforehand and regardless of the mutual position between support element and piece to be checked the angular arrangement of the contact direction of the feeler on the surface of the piece to be checked. In this way, should there be the need, for example, to utilize the apparatus for roundness checkings, at least part of the processings of the detected values—required for the checkings carried out by the known apparatuses—are not necessary, and this enables, among other things, to minimize the approximations in the calculations and make the checking operations more immediate and reliable.

BRIEF DESCRIPTION OF THE DRAWINGS

A preferred embodiment of the invention is now described in more detail with reference to the enclosed sheets of drawings, given by way of non-limiting example, wherein:

FIG. 8 is a side view of a measuring apparatus, mounted on the grinding-wheel slide of a crankshaft grinding machine, according to a third embodiment of the invention;

FIG. 9, is a partly cross sectioned side view of a measuring apparatus according to a fourth embodiment of the invention, mounted on the grinding-wheel slide of a crankshaft grinding machine; and FIG. 10 is a cross-sectional view of a particular of the apparatus of FIG. 9, along the line X—X of FIG. 9.

BEST MODE FOR CARRYING OUT THE INVENTION

Figure 3:
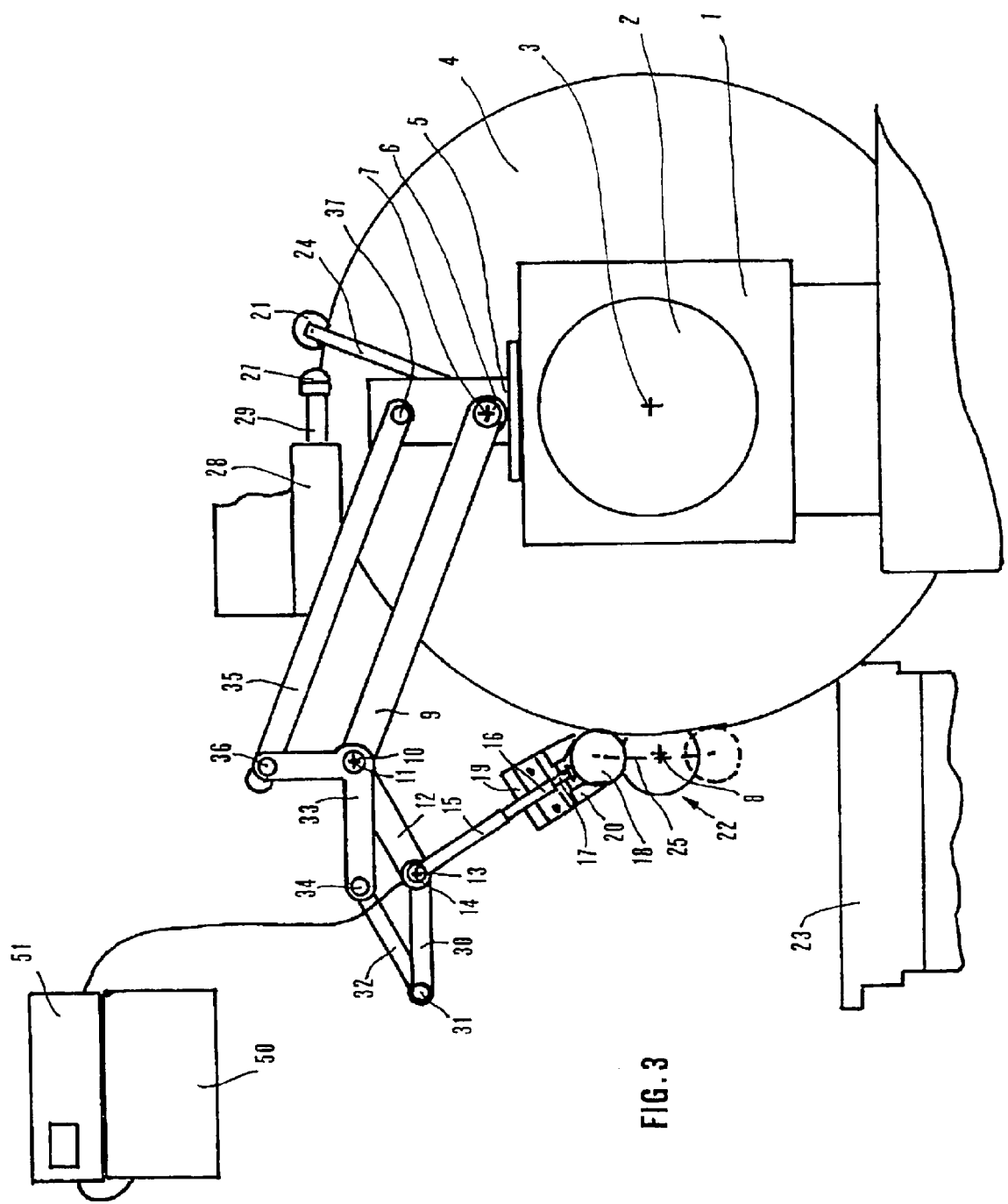
FIG. 3 is a side view of a measuring apparatus according to a preferred embodiment of the invention, mounted on the grinding-wheel slide of a crankshaft grinding machine, shown in working conditions in the course of the checking of a crankpin while it is being machined.

With reference to FIG. 3, the grinding-wheel slide 1 of a computer numerical control ("CNC") grinding machine for grinding a crankshaft supports a spindle 2 that defines the axis of rotation 3 of the grinding wheel 4. The grinding-wheel slide 1 carries a support device with a stationary support element 5 and a coupling mechanism including coupling and constraining elements. More specifically, the support element 5 supports, by means of a rotation pin 6, a first rotating coupling element 9. Pin 6 defines a first axis of rotation 7 parallel to the axis of rotation 3 of grinding wheel 4 and to the axis of rotation 8 of the crankshaft to be checked. In turn, coupling element 9, by means of a second rotation pin 10, defining a second axis of rotation 11 parallel to axes 3 and 8, supports a second rotating coupling element 12. At the free end of the second coupling element 12 there is coupled, by means of a third rotation pin 13 defining a third axis of rotation 14 parallel to axes 3 and 8, a guide casing 15 wherein there can axially translate a transmission rod 16 carrying a feeler 17 for contacting the surface of crankpin 18 to be checked. The displacements of rod 16 are detected by a measuring device, as hereinafter disclosed. At the lower end of the guide casing 15 there is coupled a support block 19 that supports a Vee-shaped reference device 20, with rest and reference surfaces for engaging the surface of crankpin 18 to be checked. Feeler 17 and transmission rod 16 are movable substantially along a measurement direction that coincides with the bisecting line of the Vee-shaped reference device 20, or is slightly angular with respect to it, but in any case crosses the Vee-shaped device 20 between the associated rest and reference surfaces.

The guide casing 15 is rigidly coupled (angularly adjustable in a known way that is not shown in detail in the figures) to a connecting rigid strip 30, also hinged on the rotation pin 13, and coupled, by means of a further pin 31, to an elongate element or rod 32. A linking element in the shape of an "L" or square 33 is hinged on pin 10, and, at a first end, by means of a pin 34, to rod 32. Another elongate element or rod 35 is hinged on the other end of the square 33 (by means of a pin 36) and on support element 5 (by means of a pin 37).

A crankshaft 22 to be checked is positioned on the worktable 23, between centers, not shown, that define the axis of rotation 8, coincident with the main geometrical axis of crankshaft 22. Consequently, crankpin 18 performs an orbital motion about axis 8. Even though crankpin 18 eccentrically rotates about axis 8, by describing a circular trajectory, the trajectory of the pin relative to the grinding-wheel slide 1 in the course of the machining can be represented, substantially, by the arc shown with a dashed line and identified by reference 25. As a consequence, the reference device 20, resting on crankpin 18, describes a similar trajectory, with a reciprocating motion from up to down and vice versa and at a frequency equal to that of the orbital motion of crankpin 18 (some tens of revolutions per minute). This is due to the fact that the checking apparatus is carried by the grinding-wheel slide 1 that, in modern numerical control grinding machines, machines the crankpins while they rotate in an orbital motion, by "tracking" the pins so as to keep the grinding-wheel in contact with the surface to be ground.

Obviously, a feed motion for the stock removal is added to the transversal "tracking" motion. Thus, it is understood that the displacements of the elements forming the checking apparatus involve relatively small forces of inertia, to the advantage of the metrological performance, limited wear and reliability of the apparatus.

A control device, schematically shown in FIG. 3, includes a double-acting cylinder 28, for example of the hydraulic type. Cylinder 28 is supported by grinding-wheel slide 1 (in a known way, not shown in the figure) and comprises a rod 29, coupled to the piston of cylinder 28, carrying a cap 27 at its free end. A transmission arm 24 is rigidly and angularly coupled to the coupling element 9 and carries a positive stop element with an idle wheel 21. When cylinder 28 is activated for displacing the piston and the rod 29 to the right (with reference to FIG. 3), cap 27 contacts idle wheel 21 and makes the apparatus displace to a rest position according to which reference device 20 is arranged above the geometric axis 8 and the upper position of crankpin 18.

The retraction of the checking apparatus to the rest position is normally controlled by the grinding machine numerical control when, on the ground of the measuring signal of the checking apparatus, it is detected that crankpin 18 has reached the required (diametral) dimension. Thereafter, the machining of other parts of the crankshaft takes place, or—in the event the machining of the crankshaft has been completed—the piece is unloaded, manually or automatically, and a new piece is loaded on worktable 23.

When a new crankpin has to be machined, it is brought in front of grinding wheel 4, usually by displacing worktable 23 (in the case of a grinding machine with a single grinding wheel), and the apparatus displaces to the checking condition. This occurs by controlling, by means of the grinding machine numerical control, cylinder 28 so that rod 29 is retracted.

Thus, cap 27 disengages from idle wheel 21 and, through rotations of the coupling elements 9, 12 and the guide casing 15, due to the specific weight of the component parts of the checking apparatus, reference device 20 approaches, by performing a trajectory with a mainly vertical component, crankpin 18, that in the meanwhile moves according to its orbital trajectory 25. Once the correct cooperation between crankpin 18 and reference device 20 is reached, this cooperation is maintained in the course of the checking phase by virtue of the displacements of the coupling elements 9, 12 and the guide casing 15 caused by the force of gravity and by the thrust of crankpin 18, the latter opposing the force of gravity of the component parts of the checking apparatus.

It should be realized that the mechanism for coupling the measuring device to the support element 5 that includes, in addition to the first 9 and second 12 coupling elements, constraining elements including corresponding rods 35 and 32, the linking element 33 and the connecting strip 30, defines two parallelogram structures. These parallelogram structures that, as previously described, define axes of rotation parallel to the axes of rotation 3 and 8 of grinding wheel 4 and of crankshaft 22 to be checked, enable substantially plain translation displacements of the guide casing 15 and of the reference device 20 fixed to it, in other words enable to keep the angular arrangement of the direction of measurement along which feeler 17 displaces unchanged, regardless of the configuration taken by the various component parts of the coupling mechanism.

Figure 1A:
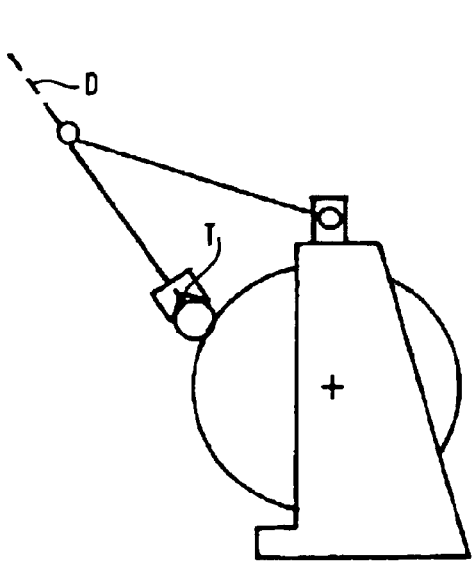
FIGS. 1a and 1b show, in simplified form, the arrangement of a known apparatus under two different operating conditions.
Figure 1B:
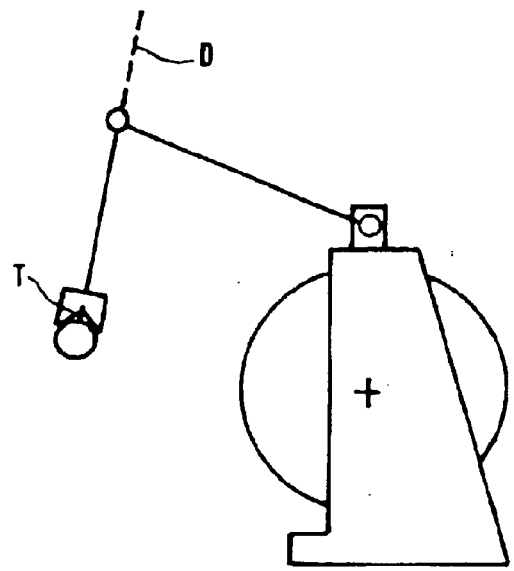
Figure 2A:
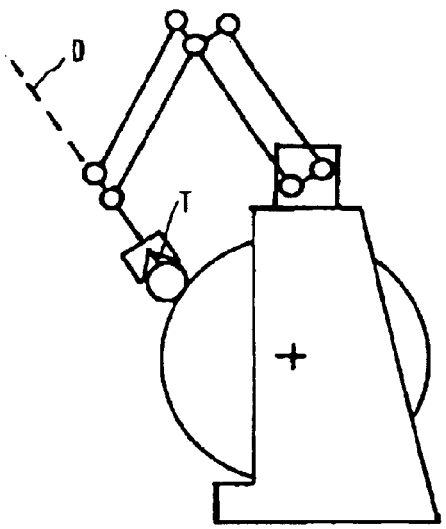
FIGS. 2a and 2b show, in simplified form, the arrangement of an apparatus according to the invention under the two different operating conditions shown in FIGS. 1a and 1b.
Figure 2B:
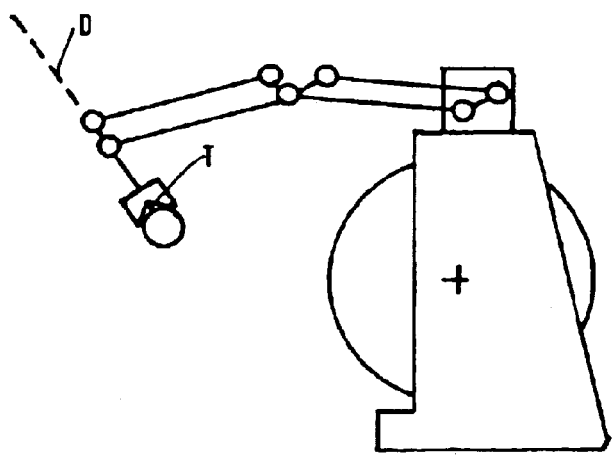

This facilitates, among other things, the checking of the roundness characteristics of the orbiting pin, because, as the angular arrangement of the contact direction of the feeler on the surface of the pin is known and constant (as shown in the sketches of FIGS. 2a and 2b), the values detected by means of the measuring device need not undergo the associated compensations mentioned in the first part of the present description. In substance, the detected values do not depend on the reciprocal position between support element 5 and checked crankshaft 22 and on the characteristics and consequent configurations taken on by the support device carrying the measuring device.

Figure 4:
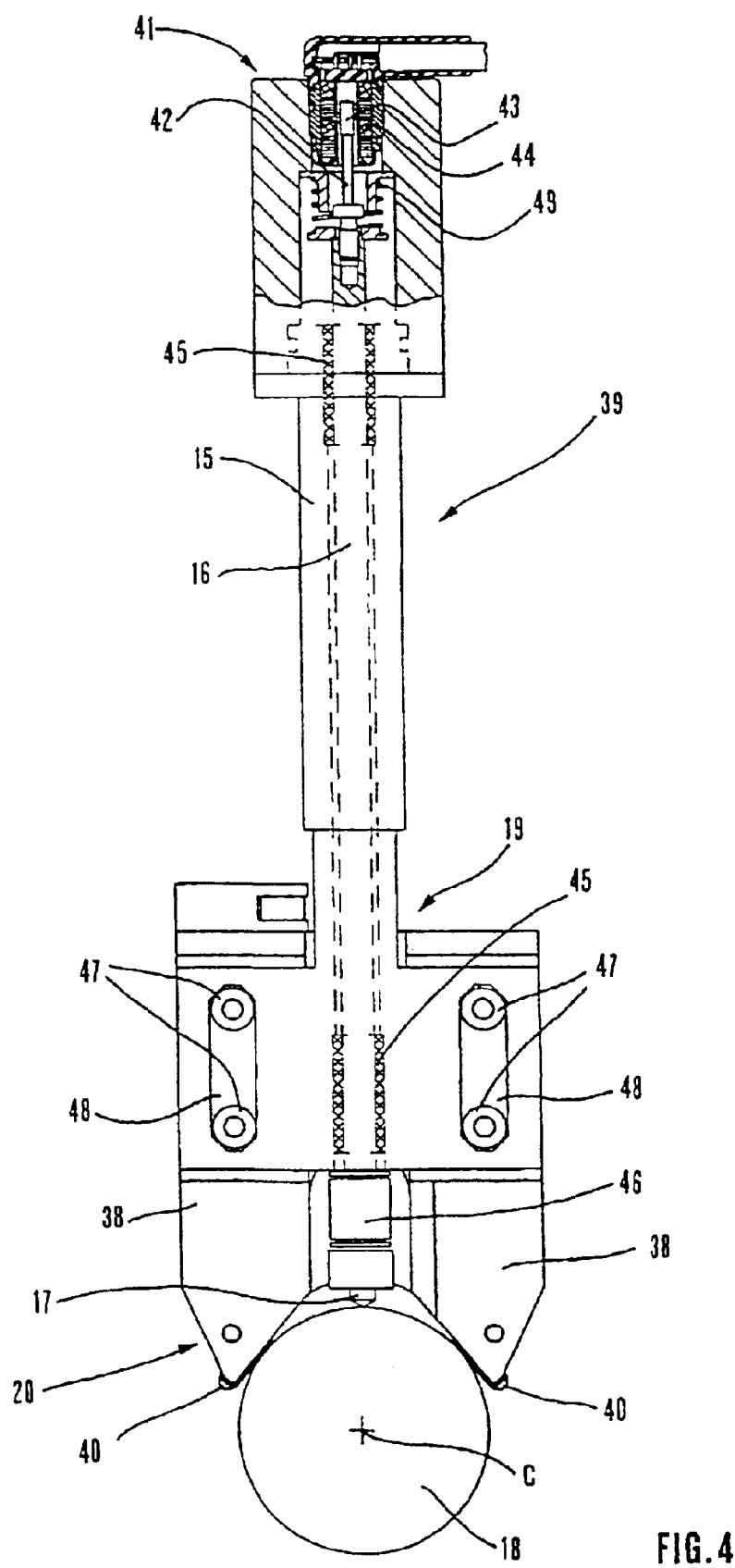
FIG. 4 is a partly cross-sectional view of the measuring system of the apparatus according to a first embodiment.

FIG. 4 shows some details of a possible embodiment of a device, or measuring head, 39 utilized in the apparatus according to the invention. The axial displacements of transmission rod 16 with respect to a reference position are detected by means of a measurement transducer fixed to casing 15, for example a transducer 41 of the LVDT or HBT known type with fixed windings 44 and a ferromagnetic core 43 coupled to a shaft 42 integral with transmission rod 16. The axial displacement of the transmission rod 16 is guided by two bushings 45, arranged between casing 15 and rod 16 and a compression spring 49 urges rod 16 and feeler 17 towards the surface of pin 18 to be checked or, in the absence of the pin, towards a rest position of feeler 17 defined by abutment surfaces not shown in the figures. A metal bellows 46, that is stiff with respect to torsional forces and has its ends fixed to rod 16 and to casing 15 or a portion of block 19 integral to it, respectively, accomplishes the dual function of preventing rod 16 from rotating with respect to casing 15 (thus preventing feeler 17 from taking improper positions) and sealing the lower end of casing 15.

The support block 19 is secured to guide casing 15 by means of pairs of screws 47 passing through slots 48 and supports the reference device 20, consisting of two elements 38 with sloping surfaces, whereto there are secured two bar shaped feelers 40. The rest position of feeler 17 can be adjusted by means of the screws 47 and slots 48.

The transducer 41 of measuring head 39 is connected to a processing and display device 51, in turn connected to the grinding machine numerical control 50 (both schematically shown in FIG. 3).

Figure 5:
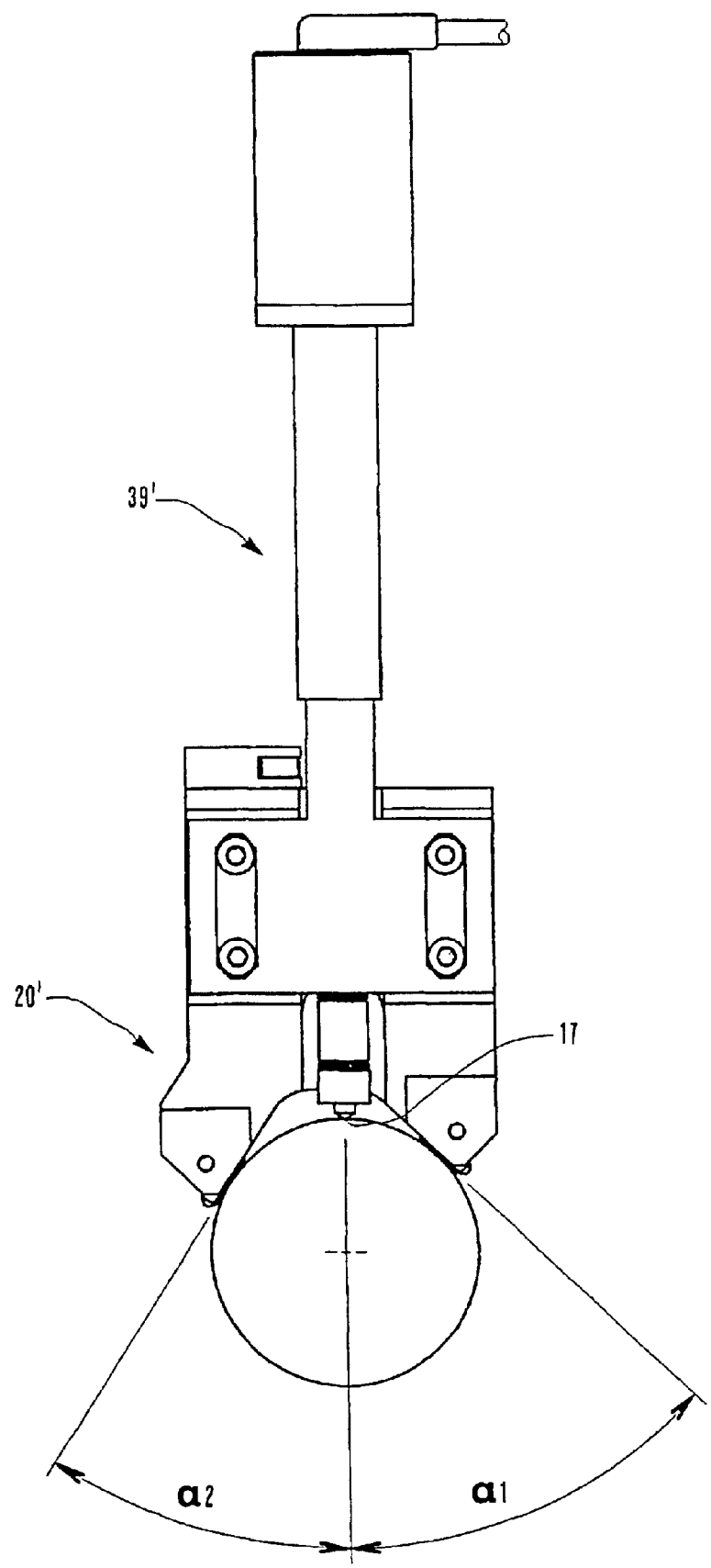
FIG. 5 is a partly cross-sectional view of the measuring system of the apparatus according to a different embodiment.

FIG. 5 shows a device, or measuring head, 39' that differs with respect to head 39 insofar as the asimmetric arrangement of the Vee-shaped reference device 20' is concerned, the latter being arranged in such a way that the direction of measurement along which feeler 17 translates is angularly sloping with respect to the bisecting line of the Vee. In the example shown in FIG. 5, the amplitude of angles α1 and α2 is 47° and 33°, respectively. The use of the asimmetric Vee 20' is particularly advantageous for carrying out roundness checkings by means of an apparatus according to the present invention, in that it increases the apparatus sensitivity thereby enabling the checking of cylindrical surfaces with lobed cross-sections in a broad range of orders.

FIGS. 6 to 9 show, in a particularly simplified form, different possible embodiments of an apparatus according to the present invention.

Figure 6:
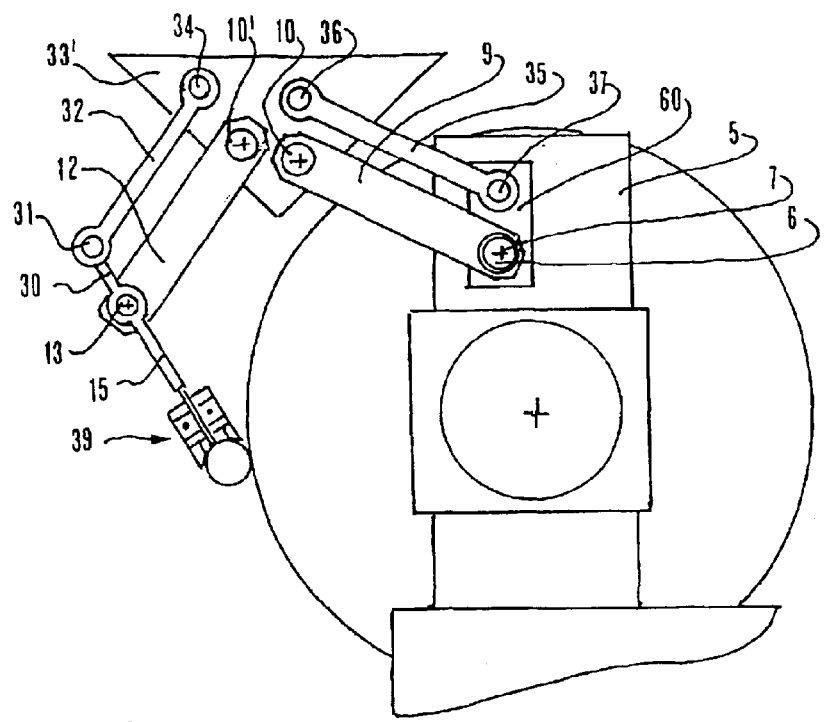
FIG. 6 is a side view of a measuring apparatus according to a different embodiment of the invention, mounted on the grinding-wheel slide of a crankshaft grinding machine, shown in working conditions in the course of the checking of a crankpin while it is being machined.
Figure 7:
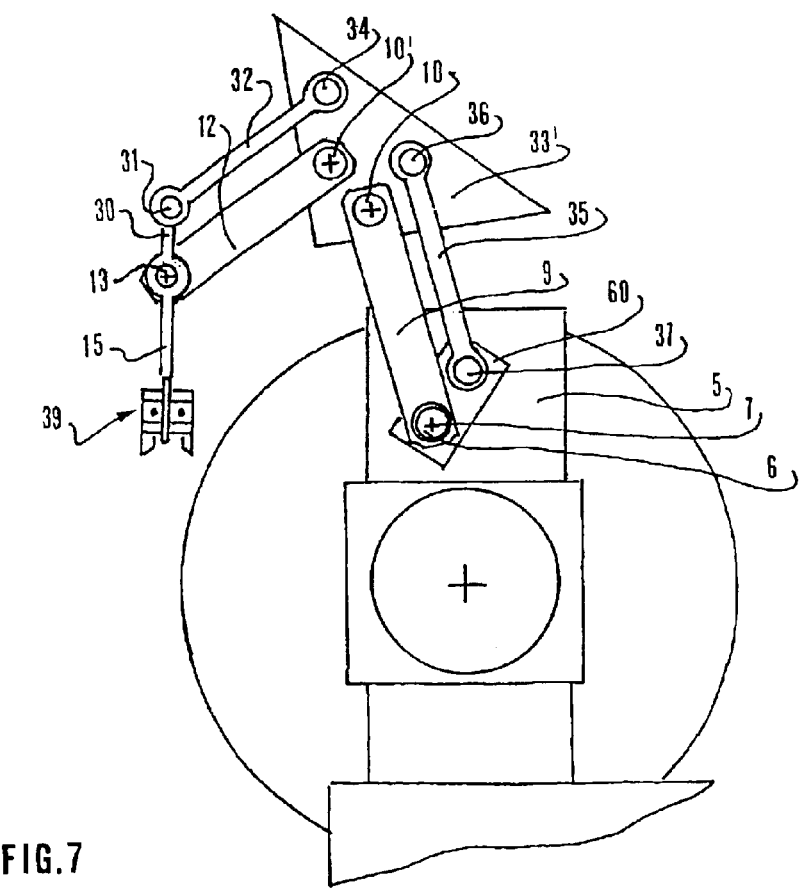
FIG. 7 is a side view of the measuring apparatus of FIG. 6, shown in a rest condition.

More specifically, the apparatus according to FIGS. 6 and 7 differs from the one shown in FIG. 3 in that it includes a different linking element achieved by means of a plate 33' on which there are hinged coupling elements 9 and 12 and rods 32 and 35. With respect to the embodiment shown in FIG. 3, the second coupling element 12 is coupled to plate 33' by means of an additional rotation pin 10' in a stationary position with respect to pin 10.

An additional feature is present in the embodiment of FIGS. 6 and 7 with respect to FIG. 3, i.e. an adjusting device with a plate 60 coupled to pin 6, pivotable about the first axis of rotation 7, and carrying pin 37 to which rod 35 is pivotably coupled.

The angular position of the adjusting plate 60 with respect to the support element 5 is fixed during the checking condition of the apparatus, thus fixing a side of one of the parallelogram structures, and consequently determining the angular arrangement of the direction of measurement along which feeler 17 displaces, as hereinbefore explained with reference to FIG. 3. The angular position of the adjusting plate 60 can be changed by means of known mechanical devices (not shown in the drawings) causing pivoting movements of plate 60 about axis 7, in order to change the above-mentioned angular arrangement of the direction of measurement along which feeler 17 displaces. The adjusting plate 60 can then be fixed in the new, modified position (by means of known mechanical means, not shown in the drawings), in order to perform new checking operations. This feature increases the flexibility of use of the apparatus, allowing easy and quick adjustments to obtain better performances in applications having different features as far as dimensions and/or arrangement of machine components are concerned. Moreover the angular position of adjusting plate 60 can be changed and then fixed (e.g. by automatic means) also while moving from the checking condition to the rest position (and vice-versa), in order to guarantee a safer position of the measuring head 39, far from the grinding wheel 4 and other moving machine parts, while the apparatus is in the inoperative condition shown in FIG. 7.

The adjusting plate 60 can be employed in the embodiment of FIG. 3, too.

In the apparatus shown in FIG. 8, one of the two parallelogram structures is replaced by a linear guide or slide—shown in simplified form in the figure and identified by reference number 70—by means of which a linking element 33" is coupled, in a slidably constrained way, to the support element 5. The coupling element or arm 12 and rod 32 are coupled to the linking element 33" by means of the pins 10' and 34, respectively. An adjusting plate similar to the one (60) of FIGS. 6 and 7 can be connected to plate 33', pivotable about pin 10' and carrying pin 34.

The support devices of the embodiments shown in FIGS. 6, 7 and 8 have coupling mechanisms that include, as the support device shown in FIG. 3, coupling elements and constraining elements that enable reference Vee 20 (or 20') to approach to and displace away from pin 18 to be checked—and to "track" pin 18 in its orbital trajectory—by performing translation displacements according to which the direction of measurement defined by the displacements of feeler 17 and of transmission rod 16 remains substantially parallel to itself.

The embodiments shown in FIGS. 3 and 6 to 8 are illustrated as an example only, while other embodiments fall within the scope of the invention. For example, the coupling mechanism of the support device can include two support sections coupled "in series"—like the parallelogram structures of FIGS. 3, 6 and 7, or the slide and the parallelogram structure of FIG. 8—and each of the two sections defines constraints that allow just plain reciprocal translation displacements among the coupled parts. Besides the parallelogram type structures and slides, there are other known devices that have the above mentioned features, for example the coupling mechanism schematically shown in the embodiment of FIGS. 9 and 10, where the two support sections include rotating coupling elements 79 and 82 having parallelepipedon-shaped closed housings 74 and 75, respectively. More specifically, the first coupling element 79 is pivotably connected to the support element 5 by means of a stationary pin 76 engaging bearings in the housing 74 (not shown in the figures) and defining a first axis of rotation 77. A second pin 80 defining a second axis of rotation 81 cooperates with bearings in both housings 74 and 75 (FIG. 10, where, for the sake of simplicity, bearings are not shown), to allow mutual rotating movements between first and second coupling elements 79 and 82. At the free end of the second coupling element 82, there is coupled, by means of a third pin 83 and corresponding bearings in housing 75 defining a third axis of rotation 84, the guide casing 15 of measuring head 39 (or 39').

Constraining elements include a first, stationary, pulley 85 that is fixed to stationary pin 76, second and third pulleys 86 and 87 fixed to the second pin 80, and a fourth pulley 88 fixed to the third pin 83. The constraining elements also include first and second belts 89 and 90 (e.g. toothed belts) tightly coupled to the first (85) and second (86) pulleys and to the third (87) and fourth (88) pulleys, respectively. By virtue of the arrangement of the two support sections including housings, pulleys and belts as above specified, the angular arrangement of the direction of measurement along which feeler 17 displaces remains unchanged during movements of the coupling mechanism involving mutual rotation between elements 79 and 82. In fact, during pivotal movements of coupling element 79 about axis 77, the first belt 89 constrains the second pulley 86 to keep its angular arrangement about axis 81. The third pulley 87 is fixed to pin 80 like pulley 86, and consequently its angular arrangement about axis 81 remains unchanged, too. In the same way, the second belt 90 prevents fourth pulley 88 from rotating about axis 84. As a result, the angular arrangement of the third pin 83—rigidly fixed to pulley 88 and carrying guide casing 15—about axis 84 does not change during pivotal movements of the coupling elements 79 and 82, thus keeping the angular arrangement of the direction of measurement along which feeler 17 displaces, and enabling plain translation displacements of the head 39.

A possible additional feature of the embodiment of FIGS. 9 and 10 consists in an adjusting device including an adjustable coupling between the first stationary pulley 85 and the support element 5, that employs per se known means that are not shown in the drawings. The adjustable coupling allows to modify and fix the angular arrangement of the pulley 85 about axis 77, in order to perform adjustments of the coupling mechanism in the same way as hereinbefore described in connection with the adjusting plate 60 of FIGS. 6 and 7.

The embodiment of FIGS. 9 and 10 has some advantages with respect to the other previously described embodiments as far as the tightness is concerned. In fact, the substantially closed structure and the possibility of easily seal the openings with bearings of housings 74 and 75, prevent dust and coolant from interfering with the proper operation of the apparatus.

Embodiments according to the present invention can also include coupling mechanisms, per se known, not clearly divisible in two sections having the above described features, that comprise coupling elements and constraining elements the combined displacements of which enable to constrain the mutually coupled parts to accomplish substantially plain translation displacements.

Other possible variants with respect to what has been herein described and illustrated can also regard the structure and the arrangement of the control device and/or the use of limiting devices with abutment surfaces, for example for limiting the reciprocal rotations among the various parts of the support device in the rest position. Furthermore, it is also possible to foresee an additional guide element coupled to reference device 20, and/or a balance spring, achieved, for example, as disclosed in international patent application WO-A-9712724.

An apparatus according to the invention is particularly suitable for the in-process checking of crankpins in orbital motion, but can obviously be utilized for dimensional or shape checkings of pins in orbital motion before or after the machining, as well as for checkings (before, during or after the machining) of pins rotating about their symmetry axes.

What is claimed is:

1. An apparatus for checking dimensional and geometrical features of a pin, rotating about a geometrical axis of rotation, comprising
   a Vee-shaped device that defines rest and reference surfaces adapted for cooperating with the pin to be checked,
   a measuring device, coupled to the Vee-shaped device and including a feeler for contacting the surface of the pin to be checked and performing linear displacements along a measurement direction laying between said rest and reference surfaces of the Vee-shaped device, and
   a support device for supporting the Vee-shaped device and the measuring device, the support device including
      a stationary support element, and
      a coupling mechanism with coupling elements coupled in a movable way to the stationary support element, carrying the Vee-shaped device and allowing displacements of the Vee-shaped device with respect to the stationary support element,
      wherein said coupling mechanism further includes constraining elements adapted for constraining said displacements of the Vee-shaped device to substantially plain translation displacements.

2. The apparatus according to claim 1, wherein said coupling elements and constraining elements define two support sections coupled in series.

3. The apparatus according to claim 2, wherein said coupling elements and constraining elements define a parallelogram structure with four axes of rotation parallel to said geometrical axis of rotation.

4. The apparatus according to claim 2, wherein at least one of said support sections includes a linear guide.

5. The apparatus according to claim 1, wherein at least some of said coupling elements and constraining elements are adapted to perform angular displacements about axes parallel to said geometrical axis of rotation.

6. The apparatus according to claim 1, further including an adjusting device coupled to at least one of said constraining elements for adjusting and fixing an angular arrangement of said measurement direction.

7. The apparatus according to claim 1, including a control device for controlling automatic displacements of the measuring device from a rest position to a checking condition and vice versa.

8. The apparatus according claim 1, for the diameter and the roundness checking of a pin orbiting about a geometric axis of rotation, in the course of the machining in a numerical control grinding machine with a worktable that defines said geometric axis and a grinding-wheel slide carrying a grinding-wheel, wherein the stationary support element is coupled to the grinding-wheel slide.

9. An apparatus for checking dimensional and geometrical features of a pin, rotating about a geometrical axis of rotation, comprising
   a Vee-shaped device that defines rest and reference surfaces adapted for cooperating with the pin to be checked,
   a measuring device, coupled to the Vee-shaped device and including a feeler for contacting the surface of the pin to be checked and performing linear displacements along a measurement direction laying between said rest and reference surfaces of the Vee-shaped device, and
   a support device for supporting the Vee-shaped device and the measuring device, the support device including
      a stationary support element, and
      a coupling mechanism with coupling elements coupled in a movable way to the stationary support element and carrying the Vee-shaped device, and constraining elements adapted for enabling substantially plain translation displacements of the Vee-shaped device with respect to the stationary support element, said coupling elements and constraining elements defining two support sections coupled in series, wherein said coupling elements and constraining elements define a parallelogram structure and an additional parallelogram structure with axes of rotation parallel to said geometrical axis of rotation.

10. The apparatus according to claim 9, wherein each of said support sections includes one of said parallelogram structure and said additional parallelogram structure.

11. The apparatus according to claim 10, wherein said constraining elements include constraining elongate elements and a linking element, each of said parallelogram structure and said additional parallelogram structure including one of said coupling elements and one of said constraining elongate elements, said linking element being coupled in a rotating way to free ends of both said coupling elements and said constraining elongate elements.

12. The apparatus according to claim 11, wherein said coupling elements are coupled to said linking element in a rotating way about an identical axis of rotation.

13. The apparatus according to claim 9, further including an adjusting device coupled to one of said parallelogram structure and said additional parallelogram structure for adjusting and fixing an angular arrangement of said measurement direction by adjusting a mutual position of at least two of said axes of rotation and said additional axes of rotation.

14. The apparatus according to claim 13, wherein said adjusting device is coupled to the stationary support element and to one of said parallelogram structure and said additional parallelogram structure.

15. An apparatus for checking dimensional and geometrical features of a pin, rotating about a geometrical axis of rotation, comprising
   a Vee-shaped device that defines rest and reference surfaces adapted for cooperating with the pin to be checked,
   a measuring device, coupled to the Vee-shaped device and including a feeler for contacting the surface of the pin to be checked and performing linear displacements along a measurement direction laying between said rest and reference surfaces of the Vee-shaped device, and
   a support device for supporting the Vee-shaped device and the measuring device, the support device including
      a stationary support element, and
      a coupling mechanism with coupling elements coupled in a movable way to the stationary support element and carrying the Vee-shaped device, and constraining elements adapted for enabling substantially plain translation displacements of the Vee-shaped device with respect to the stationary support element, said coupling elements and constraining elements defining two support sections coupled in series, wherein the constraining elements include pulleys and belts, each of said support sections including a rotating coupling element, a couple of said pulleys and one of said belts.

16. The apparatus according to claim 15, wherein each of said support sections includes a substantially closed housing, said couple of pulleys and said one of said belts being arranged within the housing.

17. The apparatus according to claim, 14 wherein one of said support sections includes a first stationary pulley coupled to the stationary support element, a second pulley and a first belt coupled to said first and second pulleys, the other of said support sections including a third pulley, a fourth pulley and a second belt coupled to said third and fourth pulleys, the Vee-shaped reference device and the measuring device being rigidly connected to the fourth pulley, the second and the third pulleys being mutually rigidly connected.

18. An apparatus for checking dimensional and geometrical features of a pin, rotating about a geometrical axis of rotation, comprising
   a Vee-shaped device adapted for cooperating with the pin to be checked,
   a measuring device, coupled to the Vee-shaped device and including a feeler for contacting the surface of the pin to be checked and performing linear displacements along a measurement direction, and
   a support device for supporting the Vee-shaped device and the measuring device, the support device including
      a stationary support element, and
      a coupling mechanism with coupling elements coupled in a movable way to the stationary support element and carrying the Vee-shaped device, wherein said coupling mechanism defines two support sections coupled in series adapted for enabling substantially plain translation displacements of the Vee-shaped device with respect to the stationary support element, each of said support sections including a parallelogram structure with four axes of rotation parallel to said geometrical axis of rotation.

19. The apparatus according to claim 18, for the diameter and the roundness checking of a pin orbitally rotating about said geometric axis of rotation, wherein the coupling mechanism is adapted for enabling said substantially plain translation displacements when the Vee-shaped device cooperates with the orbitally rotating pin.

20. An apparatus for checking dimensional and geometrical features of a pin, orbitally rotating about a geometrical axis of rotation, comprising a Vee-shaped device adapted for cooperating with the orbitally rotating pin to be checked, a measuring device, coupled to the Vee-shaped device and including a feeler for contacting the surface of the pin to be checked and performing linear displacements along a measurement direction, and a support device for supporting the Vee-shaped device and the measuring device, the support device including
a stationary support element, and
a coupling mechanism carrying the Vee-shaped device and defining two support sections coupled in series and including coupling elements coupled in a movable way to the stationary support element, wherein said coupling mechanism is adapted for enabling substantially plain translation displacements of the Vee-shaped device, cooperating with the orbitally rotating pin, with respect to the stationary support element, at least one of said support sections including a parallelogram structure with four axes of rotation parallel to said geometrical axis of rotation.

* * * * *